(12) United States Patent
Jaouen et al.

(10) Patent No.: US 11,780,008 B2
(45) Date of Patent: Oct. 10, 2023

(54) BACKUP COOLING DEVICE FOR HOT ISOSTATIC PRESS

(71) Applicant: COMMISSARIAT À L'ÉNERGIE ATOMIQUE ET AUX ÉNERGIES ALTERNATIVES, Paris (FR)

(72) Inventors: Alain Jaouen, Monts (FR); Denis Autissier, Saint Avertin (FR)

(73) Assignee: COMMISSARIAT Á L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 185 days.

(21) Appl. No.: 16/647,785

(22) PCT Filed: Sep. 14, 2018

(86) PCT No.: PCT/FR2018/052259
§ 371 (c)(1),
(2) Date: Mar. 16, 2020

(87) PCT Pub. No.: WO2019/053386
PCT Pub. Date: Mar. 21, 2019

(65) Prior Publication Data
US 2020/0230700 A1    Jul. 23, 2020

(30) Foreign Application Priority Data
Sep. 18, 2017    (FR) .................................. 1758636

(51) Int. Cl.
*B29C 43/10*    (2006.01)
*B22F 3/15*    (2006.01)
(Continued)

(52) U.S. Cl.
CPC .............. *B22F 3/15* (2013.01); *B30B 11/002* (2013.01); *B22F 3/24* (2013.01);
(Continued)

(58) Field of Classification Search
CPC . B30B 11/002; B30B 15/00; B01J 3/03; B01J 3/04; B01J 3/008; B29C 2035/1616;
(Continued)

(56) References Cited

U.S. PATENT DOCUMENTS 4,301,320 A    11/1981  Hochstrasser
8,573,962 B2*  11/2013  Yamagata ............. B30B 11/002
                                              425/405.2

FOREIGN PATENT DOCUMENTS

CN    201912951 U    8/2011
JP    S6117892 A     1/1986
(Continued)

OTHER PUBLICATIONS

International Search Report for PCT/FR2018/052259 dated Apr. 1, 2019.
(Continued)

*Primary Examiner* — Thu-Khanh T. Nguyen
(74) *Attorney, Agent, or Firm* — Pearne & Gordon LLP

(57) ABSTRACT

A backup cooling device intended for a hot isostatic press, the press comprising a compression chamber, a tank containing a gas and a first gas flow circuit for the gas to flow between the gas tank and the compression chamber. The backup cooling device comprises a tank containing a coolant equipped with a first heat exchanger for exchanging heat between the gas and the coolant, a coolant flow circuit forming a closed loop including the tank and a cooling circuit arranged around the compression chamber, a second gas flow circuit for the gas, extending from a connecting valve connecting it to the first gas flow circuit, and including the first heat exchanger, a control module (CMD) suitable for controlling the connecting valve so as to open it in the event of a malfunction of the hot isostatic press, and otherwise to close it.

11 Claims, 2 Drawing Sheets

(51) Int. Cl.
*B30B 11/00* (2006.01)
*B22F 3/24* (2006.01)
*B30B 15/28* (2006.01)
*B29C 35/16* (2006.01)

(52) U.S. Cl.
CPC ..... *B22F 2003/153* (2013.01); *B22F 2998/10* (2013.01); *B22F 2999/00* (2013.01); *B29C 35/16* (2013.01); *B30B 15/28* (2013.01)

(58) Field of Classification Search
CPC ............ B29C 2035/1658; B29C 35/04; B29C 35/041; B29C 35/045; B29C 35/16; B29C 2035/046; B29C 35/0238
USPC ................................................. 425/77, 405.2
See application file for complete search history.

(56) References Cited

FOREIGN PATENT DOCUMENTS

JP  H01230986 A  9/1989
SU     424660 A1  4/1974

OTHER PUBLICATIONS

Written Opinion for PCT/FR2018/052259 dated Apr. 1, 2019.
Search Report for French Application No. FR1758636 dated Jun. 27, 2018.

* cited by examiner

BACKUP COOLING DEVICE FOR HOT ISOSTATIC PRESS

CROSS-REFERENCE TO RELATED APPLICATIONS

This is a National Stage application of PCT international application PCT/FR2018/052259, filed on Sep. 14, 2018, which claims the priority of French Patent Application No. 17 58636, filed Sep. 18, 2017, both of which are incorporated herein by reference in their entirety.

TECHNICAL FIELD

The present invention generally relates to the field of hot isostatic presses, referred to as HIP, or equivalent to hot isostatic compaction called CIC.

It more particularly relates to the backup cooling of a hot isostatic press.

PRIOR ART

The backup cooling on a hot isostatic press is put into service following a technical alarm during the use of the press, such as for example an emergency cut-off, a fault with the electrical power supply of the press or a fault with the circulation pump.

A first known method for providing a backup cooling on a hot isostatic press uses lost water. Cooling with lost water generates industrial water discharges and imposes afterwards an emptying of the cooling circuit and a filling with corrosion inhibiting products.

A second known method for providing a backup cooling on a hot isostatic press uses electric generators to keep the circulation pumps operating. Using electric generators generates an extra financial cost and requires increased maintenance.

DISCLOSURE OF THE INVENTION

The invention aims to resolve the problems of prior art by providing a backup cooling device intended for a hot isostatic press, the press including a compression chamber, a reservoir of a gas and a first circulation circuit of the gas between the gas reservoir and the compression chamber, characterised in that it includes:

a reservoir of a cooling liquid provided with a first heat exchanger between the gas and the cooling liquid, a circulation circuit of the cooling liquid forming a closed loop including the reservoir and a cooling circuit disposed around the compression chamber, a second circulation circuit of the gas, extending from a connecting valve to the first circulation circuit of the gas, and including the first heat exchanger, a control module able to control the connecting valve in order to open it in case of an operating fault of the hot isostatic press, and close it otherwise.

Thanks to the invention, the backup cooling of the hot isostatic press is carried out autonomously using the pneumatic energy stored in the press.

The device uses the energy generated by the expansion of the compressed gas in order to provide the circulation of the cooling fluid as well as the cooling thereof. The device allows for an operation of the cooling circuit in a closed circuit.

According to a preferred characteristic, the circulation circuit of the cooling liquid further includes a first circulation pump actuated by the circulation of the gas in the second circulation circuit of the gas.

According to a preferred characteristic, the control module also controls the connecting valve to close it if the temperature of the gas at the inlet of the first heat exchanger is less than a first predetermined value.

According to a preferred characteristic, the control module also controls the connecting valve to open it if the temperature of the cooling liquid around the chamber is greater than a second predetermined value.

According to a preferred characteristic, the backup cooling device includes a second heat exchanger between the gas and the cooling liquid, placed at the inlet of the circulation circuit of the cooling liquid in the reservoir of cooling liquid.

According to a preferred characteristic, the connecting valve is a normally open valve.

According to a preferred characteristic, the first circulation circuit of the gas also includes an outlet valve of the compression chamber and an outlet valve of the gas reservoir, and the control module is able to control the outlet valve of the compression chamber to open it and the outlet valve of the gas reservoir to close it, in case of an operating fault of the hot isostatic press and as long as the pressure of the gas in the second circulation circuit of the gas is greater than a predetermined value.

According to a preferred characteristic, the control module is able to control the outlet valve of the compression chamber to close it and the outlet valve of the gas reservoir to open it, in case of an operating fault of the hot isostatic press and when the pressure of the gas in the second circulation circuit of the gas is less than the predetermined value.

According to an embodiment, the backup cooling device includes a circulation circuit of compressed air successively including a reservoir of compressed air, an output valve of the reservoir of compressed air, a third heat exchanger in the reservoir of cooling liquid and an exhaust, the control module is able to control the outlet valve of the compression chamber to close it and the outlet valve of the reservoir of compressed air to open it, in case of an operating fault of the hot isostatic press and when the pressure of the gas in the second circulation circuit of the gas is less than the predetermined value.

According to a preferred characteristic, the backup cooling device includes a fourth heat exchanger between the compressed air and the cooling liquid, placed at the inlet of the circulation circuit of the cooling liquid in the reservoir of cooling liquid.

According to a preferred characteristic, the circulation circuit of the cooling liquid further includes a second circulation pump actuated by the circulation of compressed air in the circulation circuit of compressed air.

The invention also relates to a hot isostatic press provided with a backup cooling device such as presented hereinabove.

The invention also relates to a method of backup cooling intended for a hot isostatic press, the press including a compression chamber, a reservoir of a gas and a first circulation circuit of the gas between the gas reservoir and the compression chamber, characterised in that it includes steps of:

detecting a technical alarm during the operation of the hot isostatic press, putting into communication the compression chamber with a second circulation circuit of gas, extending from a connecting valve to the first circulation circuit of the gas, and including a first heat exchanger disposed in a reservoir of a cooling liquid, a circulation circuit of the cooling liquid forming a closed loop including the reservoir and a cooling circuit disposed around the compression chamber.

The hot isostatic press and the method have advantages similar to those presented hereinabove.

In a particular embodiment, the steps of the method according to the invention are implemented by computer program instructions.

Consequently, the invention also concerns a computer program on an information medium, this program being able to be implemented in a computer, this program including instructions suitable for the implementing of the steps of a method such as described hereinabove.

This program can use any programming language, and be in the form of source code, object code, or an intermediate code between source code and object code, such as in a partially compiled form, or in any other desirable form.

The invention also relates to an information medium that can be read by a computer, and including computer program instructions suitable for the implementing of the steps of a method such as described hereinabove.

The information medium can be any entity or device able to store the program. For example, the medium can include a means of storage, such as a ROM, for example a CD ROM or a ROM of a microelectronic circuit, or a means of magnetic recording, for example a diskette or a hard drive.

On the other hand, the information medium can be a medium that can be transmitted such as an electrical or optical signal, which can be conveyed via an electrical or optical cable, by radio or by other means. The programme according to the invention can be in particular downloaded on a network of the Internet type.

Alternatively, the information medium can be an integrated circuit wherein the program is incorporated, the circuit being adapted to execute or to be used in the execution of the method according to the invention.

BRIEF DESCRIPTION OF THE DRAWINGS

Other characteristics and advantages shall appear when reading the following description of a preferred embodiment, given as a non-limiting example, described in reference to the figures wherein.

DETAILED DISCLOSURE OF PARTICULAR EMBODIMENTS

Figure 1:
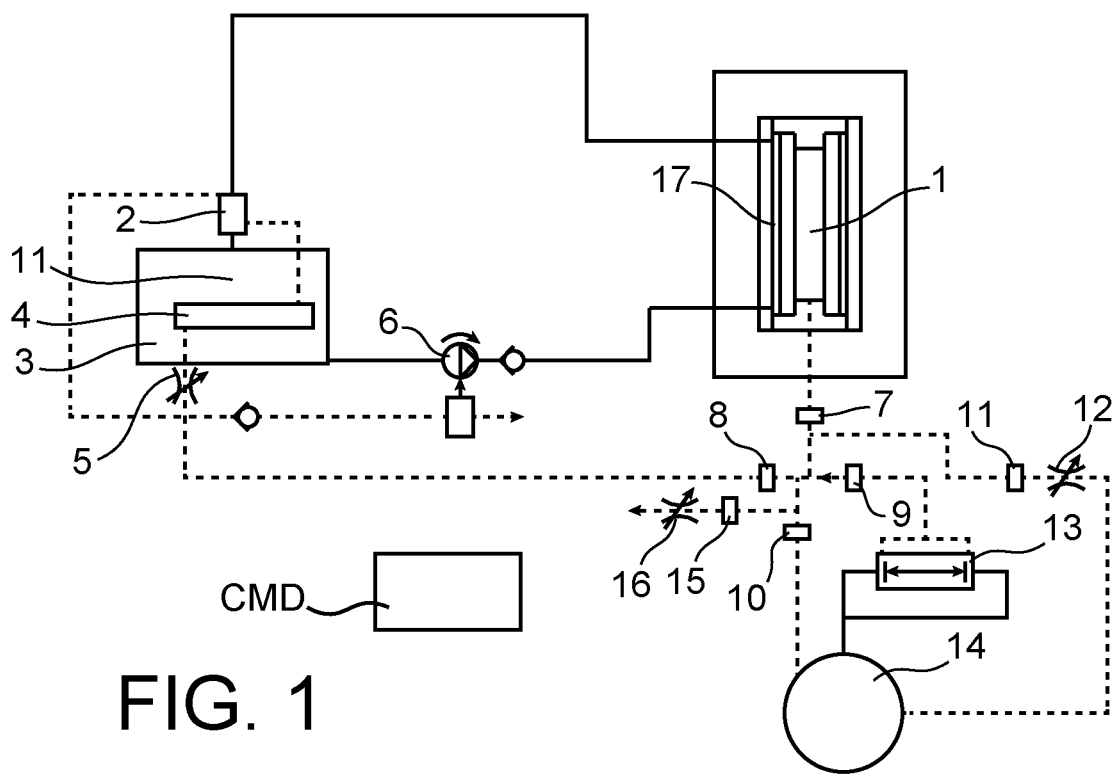
FIG. 1 shows a hot isostatic press provided with a backup cooling device, according to a first embodiment of the invention.

According to a preferred embodiment, shown in FIG. 1, a hot isostatic press is provided with a backup cooling device.

The hot isostatic press in itself is conventional, and only the elements that are essential for understanding the invention are described and shown. In particular, the hot isostatic press includes a heating device known per se, not shown.

The hot isostatic press includes a compression chamber 1, that is pressure resistant and intended to receive an object to be treated.

The compression chamber 1 receives an inert processing gas, for example argon, to carry out a hot isostatic compression. For this, a first circulation circuit of inert gas includes a reservoir of gas 14 and a network of conduits associated with valves and with a pressure multiplier 13.

More precisely, to convey the gas to the compression chamber 1, an outlet of the reservoir 14 is connected to the pressure multiplier 13 which itself is connected to a normally closed valve 9. The valve 9 is connected to a normally open valve 7 which is itself connected to an inlet of the compression chamber 1.

Conversely, to convey the gas from the press to the reservoir 14, the valve 7 is also connected to a decompression valve 11, itself connected to a regulating valve 12. The regulating valve 12 is connected to the reservoir 14.

The valve 7 is also connected to an exhaust valve 15 itself connected to a calibrated orifice 16 leading to the ambient atmosphere, in such a way as to lower the pressure in the chamber 1, if needed. The reservoir 14 is provided, from another outlet of the reservoir 14, with a normally open valve 10 connected between valves 7 and 9.

According to the invention, a circulation circuit of the inert gas extends from a normally open valve 8 connected between valves 7 and 9 of the first circulation circuit of the inert gas.

The normally open valve 8 is connected to an expansion system 5 itself connected to a first heat exchanger 4 placed in a reservoir 3 of cooling liquid. The reservoir of cooling liquid is sized according to the characteristics of the press. It is generally of high capacity, for example about a few cubic metres, so as to benefit from good inertia. It is possible to provide furthermore a finning of the reservoir in order to improve the cooling of the latter by an exchange of heat with the ambient air.

The first heat exchanger 4 is connected to a second heat exchanger 2 disposed outside the reservoir 3.

The second heat exchanger 2 is connected to an actuator of a circulation pump 6, for example a reciprocating diaphragm pump that operates using a pressurised gas. The actuator has an outlet which is an exhaust into the ambient atmosphere.

According to the invention, a circulation circuit of the cooling liquid forms a closed loop including the reservoir 3 and a cooling circuit 17 disposed around the compression chamber 1.

More precisely, in the direction of circulation going from the hottest to the coolest of the cooling liquid, an outlet of the cooling circuit 17 disposed around the compression chamber 1 is connected to the heat exchanger 2. The heat exchanger 2 is connected to the reservoir 3 of cooling liquid and is located upstream of the latter with regards to the circulation of the cooling liquid. An outlet of the reservoir 3 of cooling liquid is connected to the circulation pump 6 which is itself connected to an inlet of the cooling circuit 17 disposed around the compression chamber 1.

A monitoring and control module CMD receives information on the operation of the hot isostatic press, in particular information on pressure, temperature and electrical magnitudes. For this, the monitoring and control module CMD is connected to sensors known per se and not shown. The monitoring and control module CMD is also connected to a an electrical power supply not shown, for example a battery, in order to energize or not the valves and thus control the opening thereof or the closing thereof. For example, energizing a normally closed valve makes it possible to open it and energizing a normally open valve makes it possible to close it.

The operation of the backup cooling device of the hot isostatic press is thus controlled by the monitoring and control module CMD. The controlling is carried out either in a computerised manner, which favours the monitoring aspect of the system, or with hard-wired logic, which favours the safety of persons.

The operation of the backup cooling device is as follows.

During a normal operation of the hot isostatic press, the normally open valve 8 is maintained controlled, i.e. it is closed. In other terms, the backup cooling device is deactivated. The compression chamber is for example at a pressure of about 3,000 bars and a temperature of 1,700° C.

The monitoring and control module CMD detects a technical alarm such as for example an emergency cut-off, a fault with the electrical power supply of the press during the use thereof or a fault with the circulation pump. The backup cooling device is triggered in case of a technical alarm.

In a first phase, the compression chamber is used as a high-pressure reserve of gas. The gas is used for cooling by expansion and the circulation of the cooling liquid.

The normally closed valves 9 and 10 are de-energized, in such a way as to close them. The reservoir of gas 14 is thus isolated from the rest of the installation.

After a delay, the compression chamber 1 is put into communication with the gas circulation circuit intended for the backup cooling. For this, the normally open valves 7 and 8 are de-energized, so as to open them. The expansion system 5 is thus pressurised by the gas of the compression chamber 1.

Note that the decompression of the gas in the compression chamber 1 already causes a drop in the temperature. The valve 8 is controlled to prevent a risk of frost at the conduit between the compression chamber 1 and the heat exchanger 4. Thus, the valve 8 is closed if the temperature of the inert gas at the inlet of the first heat exchanger 4 is less than a first predetermined value.

The valve 8 is also controlled according to the temperature of the cooling liquid around the compression chamber. Thus, valve 8 is opened if the temperature of the cooling liquid around the compression chamber is greater than a second predetermined value.

The gas arrives at the heat exchanger 4 by undergoing an expansion which lowers the temperature thereof, which cools the cooling liquid in the reservoir 3.

The gas continuous its path through the exchanger 2 and undergoes a second expansion which allows for a lowering of the temperature of the cooling liquid at the inlet of the reservoir 3.

Once expanded, the gas is directed towards the actuator of the circulation pump 6 before discharge outside the installation. The circulation pump 6 is thus actuated in order to circulate the cooling liquid in the circuit thereof.

The cooling liquid that circulates in the closed circuit therefore exits from the press, thus undergoes a cooling in the exchanger 2 then in the exchanger 4 and is reinjected into the press.

In a second phase, the reservoir 14 is used as a high-pressure reserve of gas. This occurs when the pressure of the gas coming from the compression chamber 1 becomes less than a value that allows for the actuating of the pump 6, for example 8 bars. The reservoir 14 is put into communication with the gas circulation circuit intended for the backup cooling. For this, the valve 7 is then energized in order to be closed and the valve 10 is de-energized in order to be opened. Thus, the compression chamber is isolated and the reservoir 14 is connected to the expansion system 5. The gas stored in the reservoir 14 is then used in the backup cooling device for the cooling and the circulation of the cooling liquid.

The backup cooling is implemented until a safety temperature of the chamber is reached.

Figure 2:
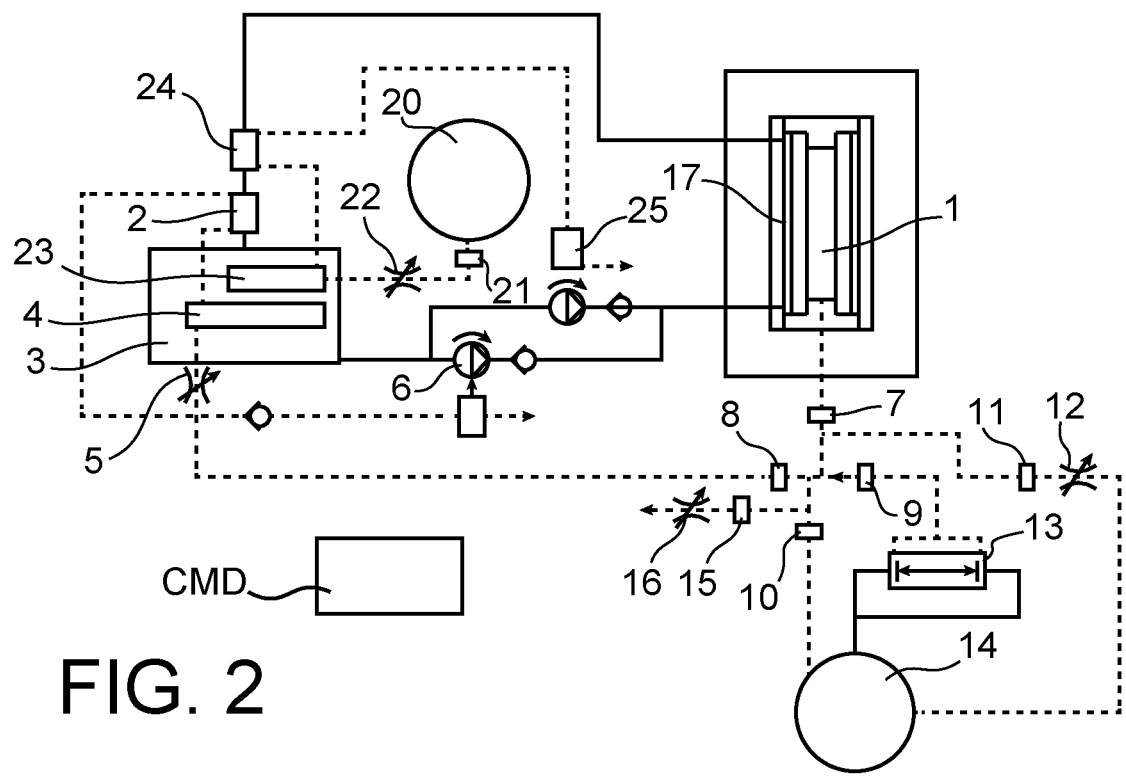
FIG. 2 shows a hot isostatic press provided with a backup cooling device, according to a second embodiment of the invention.

FIG. 2 shows a second embodiment of the backup cooling device intended for a hot isostatic press according to the invention.

This embodiment includes elements that are identical to those of the first embodiment described in reference to FIG. 1. These elements bear the same numerical references and are not described again. Only the differences between the two embodiments are detailed.

The device includes a circulation circuit of compressed air. This circuit includes a reservoir 20 of compressed air, for example at a pressure of 200 bars. The reservoir 20 is connected to a normally open valve 21 itself connected to an expansion system 22.

The expansion system 22 is connected to a third heat exchanger 23 located in the reservoir of cooling liquid 3. The third heat exchanger 23 is connected to a fourth heat exchanger 24 located outside the reservoir 3, upstream from the latter with regards to the circulation of the cooling liquid.

The fourth heat exchanger 24 is connected to an actuator of a circulation pump 25 of cooling liquid. The actuator is connected to a exhaust outlet in the ambient atmosphere.

The outlet of the reservoir of cooling liquid includes a by-pass, parallel to the circulation pump 6. This by-pass includes the circulation pump 25.

In nominal operation of the press and in the first operating phase of the backup cooling device, the valve 21 is energized in such a way that it is closed. The first operating phase of the backup cooling device according to this embodiment is identical to that of the backup cooling device according to the first embodiment. Thus, it is the gas of the compression chamber 1 that allows for the cooling and the circulation of the cooling liquid.

The second operating phase of the device is modified in the following way. When the pressure of the gas coming from the compression chamber becomes less than a value that allows for the actuating of the pump 6, for example 8 bars, valve 7 is energized in order to be closed and valve 21 is de-energized in order to be opened. Thus, the compression chamber is isolated from the gas circulation circuit of the backup cooling device, and the compressed air of the reservoir 20 circulates in the compressed air circuit. The compressed air arrives at the heat exchanger 23 by undergoing an expansion that lowers the temperature thereof, which cools the cooling liquid in the reservoir 3.

The compressed air continues its path through the exchanger 24 and undergoes a second expansion which allows for a lowering of the temperature of the cooling liquid at the inlet of the reservoir 3.

Once expanded, the compressed air is directed towards the actuator of the circulation pump 25 before discharge outside the installation. The circulation pump 25 causes the circulation of the cooling liquid in the circuit thereof.

Thus in the second phase, the compressed air replaces the inert gas for the cooling and the circulation of the cooling liquid, which makes it possible to save the gas.

Figure 3:
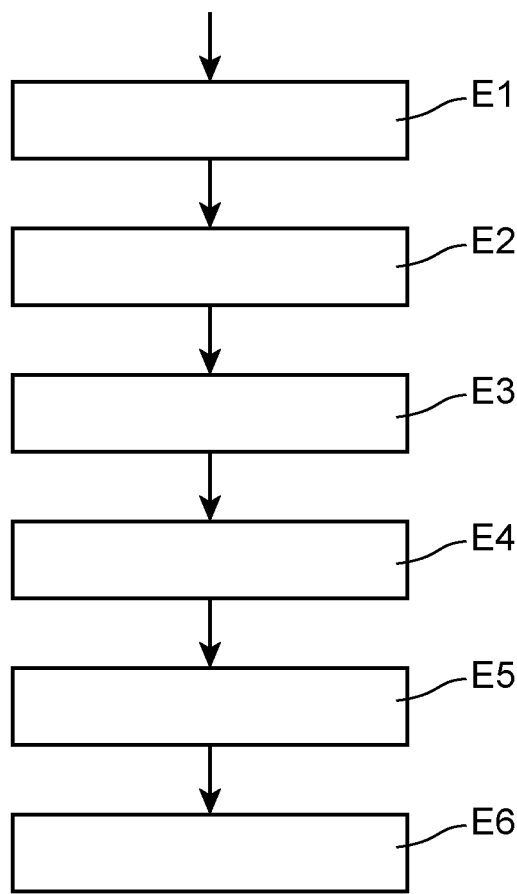
FIG. 3 shows a method of backup cooling of a hot isostatic press, according to an embodiment of the invention.

FIG. 3 shows a method of backup cooling intended for a hot isostatic press according to an embodiment of the invention. The method is implemented in the monitoring and control module CMD and includes steps E1 to E6.

Step E1 is the detecting of a technical alarm during the operation of the hot isostatic press.

In the following step E2, the gas reservoir 14 is isolated from the rest of the installation.

The following step E3 is a delay.

After this delay, the following step E4 is the putting into communication of the compression chamber 1 with the gas circulation circuit intended for the backup cooling. The gas then allows for the cooling and the circulation of the cooling liquid.

Steps E1 to E4 correspond to the first operating phase of the backup cooling device, which was disclosed hereinabove.

The following step E5 is a test for determining that the pressure of the gas coming from the compression chamber 1 becomes less than a value that allows for the actuating of the pump 6, for example 8 bars.

When this condition is realised, step E5 is followed by step E6 in which, according to a first embodiment, the reservoir 14 is put into communication with the gas circulation circuit intended for the backup cooling. This is therefore the second operating phase of the backup cooling device, which was disclosed hereinabove.

According to a second embodiment of step E6, it is the compressed air circuit that allows for the cooling and the circulation of the cooling liquid.

Figure 4:
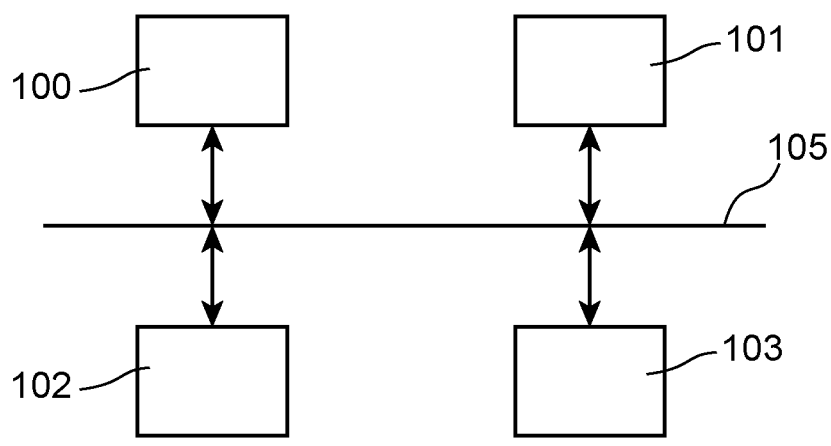
FIG. 4 shows a monitoring and control module implemented in a backup cooling device, according to an embodiment of the invention.

FIG. 4 shows a particular embodiment of the monitoring and control module CMD, according to the invention.

The monitoring and control module CMD has the general structure of a computer. It includes in particular a processor 100 executing a computer program that implements the method described hereinabove, a memory 101, an input interface 102 and an output interface 103.

These different elements are conventionally connected by a bus 105.

The input interface 102 is connected to the different sensors that are provided on the hot isostatic press and is intended to receive information on the operation of the press.

The processor 100 executes the processing disclosed hereinabove. This processing is carried out in the form of code instructions of the computer program which are memorised by the memory 101 before being executed by the processor 100.

The output interface 103 delivers the control instructions of the different valves implemented in the framework of the invention.

What is claimed is:

1. A hot isostatic press, the hot isostatic press including:
a compression chamber and a back up cooling device,
the back up cooling device including:
  a gas reservoir of a gas, and
  a first circulation circuit of the gas between the gas reservoir and the compression chamber,
    the first circulation circuit including:
      a cooling liquid reservoir of a cooling liquid provided with a first heat exchanger between the gas and the cooling liquid,
      a circulation circuit of the cooling liquid forming a closed loop including the cooling liquid reservoir and a cooling circuit disposed around the compression chamber,
  a second circulation circuit of the gas, extending from a connecting valve to the first circulation circuit of the gas, and including the first heat exchanger, and
  a control module able to control the connecting valve in order to open it in case of an operating fault of the hot isostatic press, and close it otherwise.

2. The hot isostatic press according to claim 1, wherein the circulation circuit of the cooling liquid further includes a first circulation pump actuated by the circulation of the gas in the second circulation circuit of the gas.

3. The hot isostatic press according to claim 1, wherein the control module also controls the connecting valve to close it if a temperature of the gas at an inlet of the first heat exchanger is less than a first predetermined value.

4. The hot isostatic press according to claim 1, wherein the control module also controls the connecting valve to open it if a temperature of the cooling liquid around the compression chamber is greater than a second predetermined value.

5. The hot isostatic press according to claim 1, wherein it includes a second heat exchanger between the gas and the cooling liquid, placed at an inlet of the circulation circuit of the cooling liquid in the cooling liquid reservoir.

6. The hot isostatic press according to claim 1, wherein the connecting valve is a normally open valve.

7. The hot isostatic press according to claim 1, wherein the first circulation circuit of the gas also includes an outlet valve of the compression chamber and an outlet valve of the gas reservoir, and in that the control module is able to control the outlet valve of the compression chamber to open it and the outlet valve of the gas reservoir to close it, in case of an operating fault of the hot isostatic press and as long as a pressure of the gas in the second circulation circuit of the gas is greater than a predetermined value.

8. The hot isostatic press according to claim 7, wherein the control module is able to control the outlet valve of the compression chamber to close it and the outlet valve of the gas reservoir to open it, in case of an operating fault of the hot isostatic press and when the pressure of the gas in the second circulation circuit of the gas is less than the predetermined value.

9. The hot isostatic press according to claim 7, wherein it includes a circulation circuit of compressed air successively including a compressed air reservoir, an output valve of the compressed air reservoir, a third heat exchanger in the cooling liquid reservoir and an exhaust, in that the control module is able to control the outlet valve of the compression chamber to close it and the outlet valve of the compressed air reservoir to open it, in case of an operating fault of the hot isostatic press and when the pressure of the gas in the second circulation circuit of the gas is less than the predetermined value.

10. The hot isostatic press according to claim 9, wherein the back up cooling device includes a fourth heat exchanger between the compressed air reservoir and the cooling liquid reservoir, placed at an inlet of the circulation circuit of the cooling liquid in the cooling liquid reservoir.

11. The hot isostatic press according to claim 9, wherein the circulation circuit of the cooling liquid further includes a second circulation pump actuated by the circulation of compressed air in the circulation circuit of compressed air.

* * * * *